United States Patent [19]

Lundgren

[11] 4,313,719

[45] Feb. 2, 1982

[54] DEVICE FOR ROLLING UP PIECES OF MATERIAL

[75] Inventor: Bror F. Lundgren, Bjuv, Sweden

[73] Assignee: Societe d'Assistance Technique pour Produits Nestle S.A., Lausanne, Switzerland

[21] Appl. No.: 236,172

[22] Filed: Feb. 20, 1981

[30] Foreign Application Priority Data

Mar. 6, 1980 [SE] Sweden ............................. 8001770

[51] Int. Cl.³ ..................... B29C 17/00; B29D 3/00
[52] U.S. Cl. ................................. 425/335; 53/117; 99/353; 100/151; 264/339; 425/371; 425/391; 425/394; 426/501
[58] Field of Search ............... 425/329, 335, 363, 371, 425/340, 343, 391, 394, 320, 321, 471; 264/339; 99/352, 353, 355, 356; 198/456; 53/116, 117 X; 100/151; 426/128, 500–502

[56] References Cited

U.S. PATENT DOCUMENTS 3,260,639  7/1966  Ives et al. ............................. 425/343
3,880,065  4/1975  Stickle ................................... 99/353

*Primary Examiner*—Willard E. Hoag
*Attorney, Agent, or Firm*—Vogt & O'Donnell

[57] ABSTRACT

The invention relates to a machine for rolling pieces of soft material in leaf form, more particularly food products, such as pancakes. According to the invention, the pieces of material are delivered on a substantially horizontal conveyor belt (1) and are brought into contact with at least one other conveyor belt (8) which crosses the first conveyor belt and has an oblique upward movement relative to the direction of movement of the first conveyor belt. The two belts (3, 9) of the two conveyors are formed by several cords or strings (4, 10) which are parallel to one another and spaced apart from one another, the belt (9) of the second conveyor crossing the horizontal belt (3) of the first conveyor by passage of its cords or strings through the spaces between the cords and strings of the first conveyor.

8 Claims, 5 Drawing Figures

DEVICE FOR ROLLING UP PIECES OF MATERIAL

This invention relates to a machine for rolling pieces of material.

More particularly the invention relates to a machine for rolling pieces of soft material in leaf form so as to produce rolls. The machine is particularly suitable for rolling flat food products, such as pancakes, with or without stuffing, swiss rolls, croissants or meat rolls or olives.

Filled pancakes represent a food product which is becoming increasingly popular among consumers. Products of this type are prepared by rolling cooked pancakes around a suitable stuffing and are sold as such, often in frozen form. For eating, the product merely has to be reheated in an oven, a pan, etc.

In the industrial production of rolled pancakes, the actual rolling of the pancake around the stuffing is a critical phase of the process. In the interests of economic production, rolling has to be able to be carried out mechanically and continuously which involves major difficulties. The pancakes are difficult to handle both before and during and after rolling because the product is fragile and does not really withstand mechanical stressing, breaks up and, as a result, becomes unacceptable to the consumer.

In addition, it is difficult to obtain a process in which the pancakes are continuously delivered to the rolling machine, are rolled and then transported in the rolled state to the packaging machine.

There are several known machines for rolling food products and in particular for producing swiss roll. However, these machines are very complex in design and, in the majority of cases, cannot be used for rolling pancakes which are considerably thinner and more fragile.

The present invention provides a machine of simple design by means of which pieces of soft material in leaf form and, in particular, cooked pancakes can be handled very carefully from delivery to the rolling machine, during the rolling process and up to transport in the rolled state for subsequent treatment.

According to the invention, the pieces of material to be rolled up are delivered on a substantially horizontal, endless belt and are brought into contact with at least one other endless belt arranged in such a way that that part of the other belt which comes into contact with the piece of material has an oblique ascending movement in relation to the direction of the first belt.

The present invention provides a machine for rolling pieces of soft material in leaf form comprising a plurality of endless belts, each belt being formed by a plurality of endless elements spaced apart from one another and running parallel to the direction of movement of the belt, the plurality of endless belts being made up of a first belt moving substantially in a horizontal plane and at least one second belt moving in an oblique plane relative to the plane of the first belt so that it crosses the first belt by passage of its elements through the spaces between the elements of the first belt along a line of intersection which forms an acute angle with the direction of movement of the first belt, the first belt forming with the second belt an obtuse angle as measured in a plane perpendicular to their line of intersection, the direction of movement of the second belt forming an acute angle with the line of intersection of the two belts.

The invention will be better understood and other objects, features, details and advantages thereof will become more clearly apparent from the following description in conjunction with the accompanying diagrammatic drawings given by way of example.

DETAILED DESCRIPTION OF THE DRAWINGS

Figure 1:
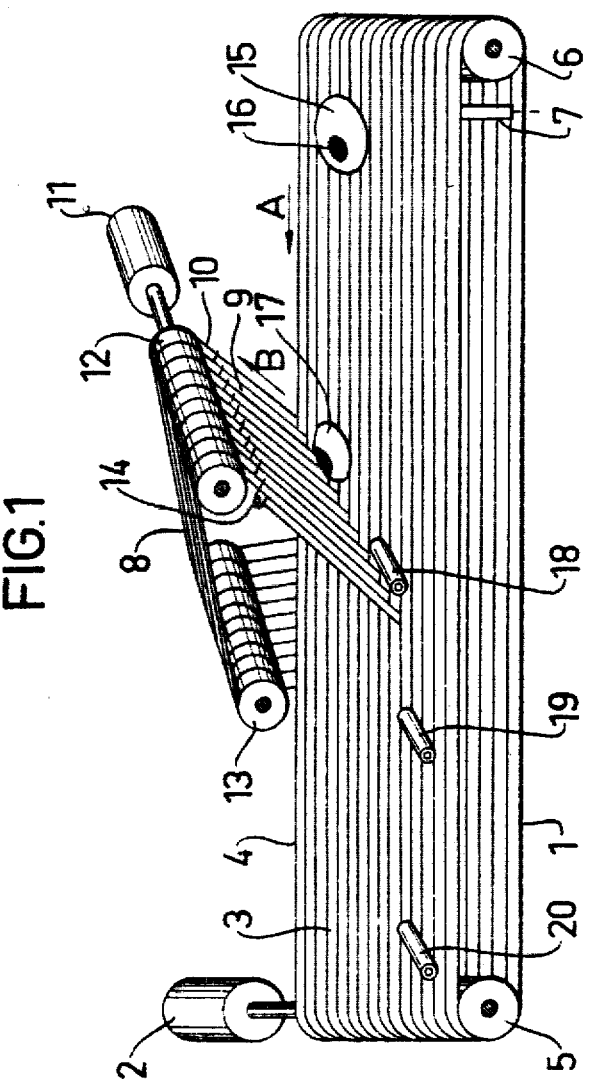
FIG. 1 illustrates a first embodiment of the invention.

FIG. 1 illustrates a first embodiment of a machine according to the invention. A first horizontal endless belt, which is generally denoted by the reference 1 and which is driven by a motor 2, is formed by a conveyor belt 3 comprising a number of cords or strings which are spaced apart from one another and one of which is denoted by the reference 4. The cords or strings travel around a drive roller 5 and a guide roller 6, these rollers being provided with peripheral grooves for guiding the cords or strings. The cords or strings are additionally guided by means of guide pins shown diagrammatically at 7 which are arranged in the manner of a comb to pass through the spaces between the parallel cords or strings. If necessary, the horizontal flight of the belt may also be supported by one or more flat support plates or by several support rollers, although these are not shown in the drawing.

A second endless belt, which is generally denoted by the reference 8, is formed like the first endless belt by a conveyor 9 of parallel cords or strings which are spaced apart from one another and one of which is denoted by the reference 10. This conveyor is driven by a motor 11 via a drive roller 12 and a guide roller 13 and also via one or more additional guide rollers the arrangement of which depends upon the way in which the belt is guided and which are not shown in the drawing. These rollers are also provided with peripheral grooves for guiding the cords or strings which are also guided by means of guide pins arranged in the form of a comb which are shown diagrammatically at 14 and which pass through the spaces between the cords or strings. Additional sets of guide pins may be provided at suitable places for the two belts should this prove necessary for ensuring the parallelism of the cords or strings and a constant spacing between them.

According to the invention, the second belt is arranged in such a way that it crosses the first horizontal belt. To this end, the cords or strings of the second belt pass through the spaces between the cords or strings of the first belt. The second belt is also arranged in such a way that it crosses the first belt along a line of intersection which forms an acute angle with the direction of movement of the first belt. As can be seen from the two direction arrows A and B in the drawing, that part of the second belt which crosses the first horizontal belt is directed obliquely upwards.

FIG. 1 also shows various stages of the rolling process. At 15, a pancake with stuffing 16 is situated at the beginning of the first belt where it was deposited by a device (not shown). The pancake is advanced by the belt to position 17 where it encounters the ascending part of the second belt 8. The front edge of the pancake is then taken up and, since the horizontal belt moves continuously, the pancake is rolled. The second belt also contributes to this, forming an obtuse angle with the horizontal belt, as measured in a plane perpendicular to their line of intersection. Since this line of intersection forms an acute angle with the direction of movement of the horizontal belt, the pancake is exposed while it is being rolled to a laterally directed force so that it is first brought into position 18 and then completely disengaged from the belt of the second conveyor in position 19. At 20, the pancake finally arrives at a place where it is taken over by a suitable device (not shown) and undergoes further treatment, such as packaging and freezing.

By carrying out relatively simple tests, the width of the belts and also their speed may be adjusted in such a way that the pancake is completely rolled before being disengaged from the sloping belt travelling upwards. It is clear that the horizontal belt must have sufficient width outside of the belt travelling upwards for the rolled pancakes to be able to continue following their path. It has been found to be appropriate for the second belt to cross the first belt along a line of intersection which forms an angle of approximately 45° with the direction of movement of the first belt, the first belt forming with the second belt an angle of approximately 135°, as measured in a plane perpendicular to their line of intersection, the direction of movement of the second belt forming an angle of approximately 45° with the line of intersection of the two belts.

Figure 2:
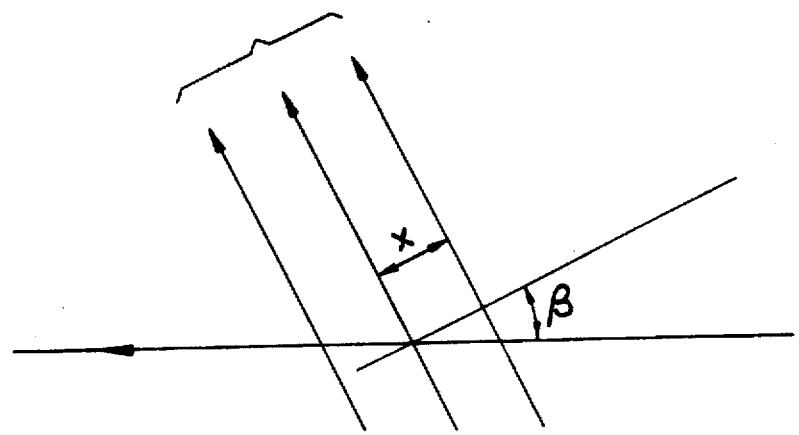
FIG. 2 is a section taken at line A—A of FIG. 3.
Figure 3:
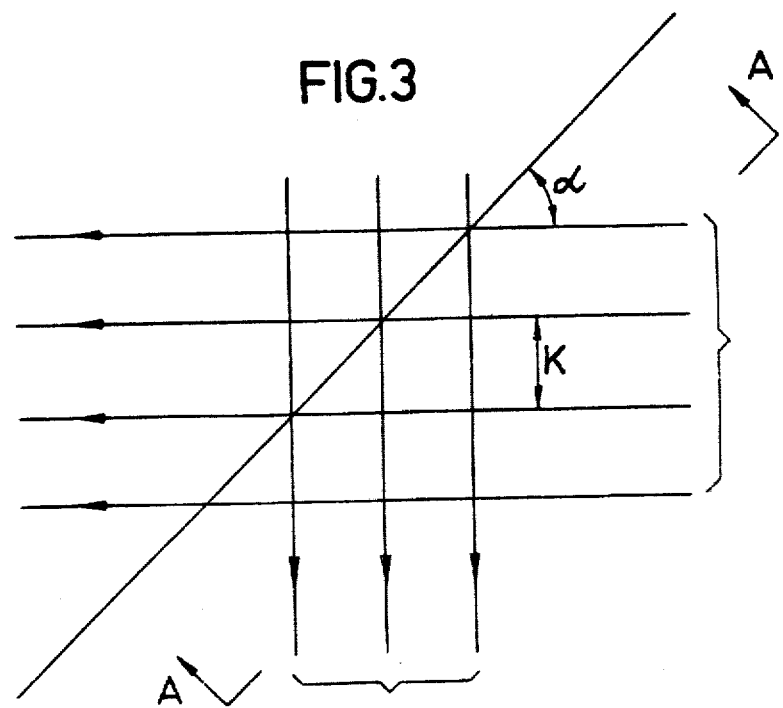
FIG. 3 is a diagrammatic plan view of the horizontal and oblique belts of the invention.

The dimensions of the two belts should of course be adapted to the size and type of products to be rolled. Thus, the cords of the horizontal belt should be arranged at sufficiently narrow intervals apart from one another for the products, which are often very soft and very fragile, to be able to be sufficiently supported without sinking to any significant extent in the spaces between the cords. On the other hand, the intervals between the cords of the horizontal belt should be sufficient for the cords of the second belt to be able to pass through without any troublesome friction. In one suitable embodiment the cords have a diameter of approximately 5 mm and the intervals between the cords of the horizontal belt are approximately 15 mm. For the second belt, the dimensions of the cords and the intervals between them are not so important because it is not necessary in this case for any material to be supported, although to obtain an adequate rolling effect the product must of course be subjected to the influence of a sufficient number of cords at one and the same time. The minimal interval X between these cords is thus as follows: $k \cos \beta / \sin \alpha$, where k is the interval between the cords of the horizontal belt and $\beta$ and $\alpha$ are the angles of intersection between the two belts as defined in FIGS. 2 and 3, FIG. 3 being a diagrammatic plan view of the horizontal and oblique belts, whilst FIG. 2 is a view on the line A—A of FIG. 3. It is advisable for the cords of the second belt to have the same diameter as those of the horizontal belt so that they are able to pass between the cords of the first belt.

Figure 4:
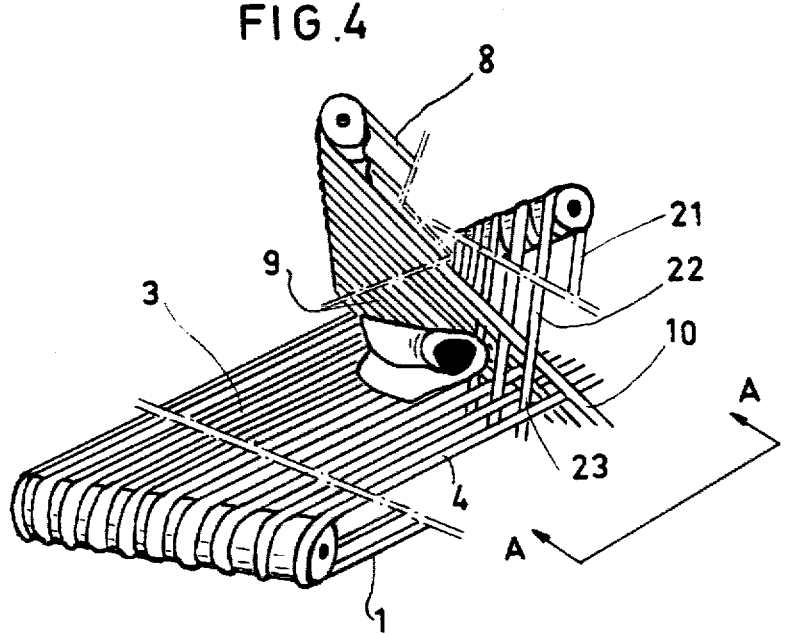
FIG. 4 illustrates a second embodiment of the invention.
Figure 5:
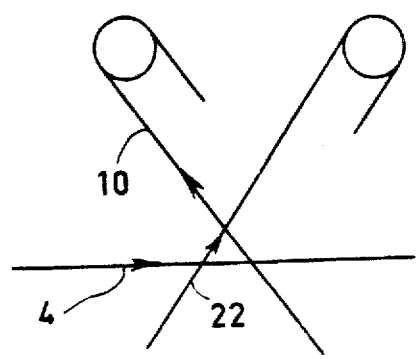
FIG. 5 illustrates the arrangement of the belts relative to one another along the line A—A of FIG. 4.

FIG. 4 illustrates a second embodiment of the machine according to the invention which has proved to be particularly suitable for treating not only thin products, such as pancakes with or without stuffing, but also products of considerably greater thickness, such as swiss rolls, croissants or thin slices of meat for making rolls or olives. In this second embodiment, a third belt 21 is arranged to cross the first two belts respectively ahead of and behind their line of intersection of passage of its strings or cords 22 between the strings or cords of these belts and thus to delimit an active section 23 which travels upwards and rearwards. This enables the rolling process to be started, the process subsequently being completed by the second belt with which the product is then brought into contact. The lines of intersection between the third belt and the first and second belts are parallel to the line of intersection between the first two belts and are separated from one another by a distance smaller than the diameter of the product after rolling to ensure that the product comes into contact with each of the belts during the rolling process. It has been found to be appropriate for the belts to cross along lines of intersection which form an angle of approximately 45° with the direction of movement of the first belt, the first belt forming an angle of approximately 135° with the second belt, the third belt forming an angle of approximately 55° with the first belt, the angles between the belts being measured in a plane perpendicular to their line of intersection. The direction of movement of the second belt forms an angle of approximately 45° and the direction of movement of the third belt an angle of approximately 45° with the lines of intersection of the belts, as shown in FIG. 5 which diagrammatically illustrates the arrangement of the belts relative to one another along the line A—A in FIG. 4. The foregoing observations on the diameter of the strings or cords and on their spacing apply equally to this embodiment.

Similarly, that part of the third belt which crosses the first belt should be narrower than the first belt and preferably equal in width to that part of the second belt which crosses the first belt to enable the rolled objects to continue following their path.

The cords or strings of the belts may be designed in different ways and made of different materials. Thus, it has been found that cords of plastic materials, such as polyvinyl chloride (PVC), polyethylene, polypropylene, polyesters or polyamides, are suitable, although other materials, such as metal, may also be used. Since the machine is primarily intended for handling food products, it is crucially important for the materials and pieces of equipment used to be able to be readily cleaned faultlessly from the point of view of hygiene. In practice, cords of polyvinyl chloride have proved to be suitable.

The belts illustrated are driven by electric motors. However, they may also be driven by means of hydraulic or pneumatic motors which can be advantageous in the case of a machine handling food products in a damp atmosphere which also has to be cleaned very carefully, for example by washing under high pressure. In a case such as this, electric motors may involve a risk of short-circuiting and sparking.

The machine according to the invention has been illustrated with reference to one of its preferred applications, namely the rolling of pancakes with stuffing. However, it should be understood that the machine according to the invention is not limited solely to this particular application and that it may be used in any case where plastically pliable leaf-form objects have to be rolled and particularly when these objects have to be treated with care. It should also be noted here that the expression "leaf-form objects" should be interpreted in a broad sense and covers objects with a considerable thickness reaching several centimeters. Thus, a machine according to the invention would also be suitable for producing swiss rolls or even meat olives. In this latter case, however, the two opposite faces of the thin slice of meat have to be folded towards the middle, for example mechanically, to enable a desired and equal length of the finished meat olive to be obtained.

The pieces of leaf-formed material may also have any shape. Thus, they may be round, oblong, square or may have any other shape.

I claim:

1. A machine for rolling pieces of soft material in leaf form, comprising a plurality of endless belts, each belt being formed by a plurality of endless elements spaced apart from one another and running parallel to the direction of movement of the belt, the plurality of endless belts being made up of a first belt moving substantially in a horizontal plane and at least one second belt moving in an oblique plane relative to the plane of the first belt so that it crosses the first belt by passage of its elements through the spaces between the elements of the first belt along a line of intersection which forms an acute angle with the direction of movement of the first belt, the first belt forming an obtuse angle with the second belt, as measured in a plane perpendicular to their line of intersection, the direction of movement of the second belt forming an acute angle with the line of intersection of the two belts.

2. A machine as claimed in claim 1, which comprises two endless belts.

3. A machine as claimed in claim 2, wherein the second belt crosses the first belt along a line of intersection which forms an angle of approximately 45° with the direction of movement of the first belt, the first belt forming with the second belt an angle of approximately 135°, as measured in a plane perpendicular to their line of intersection, the direction of movement of the second belt forming an angle of approximately 45° with the line of intersection of the two belts.

4. A machine as claimed in claim 1 which comprises three endless belts, the third belt moving in an oblique plane relative to the plane of the first belt and crossing the first and second belts by passage of its elements through the spaces between the elements of these two belts, the line of intersection between the third belt and the second belt being above the horizontal plane of the first belt and substantially parallel to the line of intersection of the first and second belts, the direction of movement of the third belt forming an acute angle with each of the directions of movement of the first and second belts.

5. A machine as claimed in claim 4, wherein the belts cross along lines of intersection which form an angle of approximately 45° with the direction of movement of the first belt, the first belt forming an angle of approximately 135° with the second belt, the third belt forming an angle of approximately 55° with the first belt, the angles between the belts being measured in a plane perpendicular to their line of intersection, the direction of movement of the second belt forming an angle of approximately 45° and the direction of movement of the third belt forming an angle of approximately 45° with the lines of intersection of the belts.

6. A machine as claimed in any of claims 1 to 4, wherein the first belt extends laterally beyond the crossing part(s) of the other belt(s).

7. A machine as claimed in any of claims 1 to 4, wherein the constituent elements of the belts are cords or strings.

8. A machine as claimed in claim 7, wherein the cords or strings have a diameter of approximately 5 mm and a spacing of approximately 15 mm.

* * * * *